United States Patent
Miwa (10) Patent No.: US 6,948,824 B2
(45) Date of Patent: Sep. 27, 2005

(54) ILLUMINATED ELECTRIC PART CAPABLE OF EFFICIENTLY RECEIVING INCIDENT LIGHT FROM LIGHT SOURCE IN LIGHT-TRANSMISSIVE MANIPULATING SHAFT

(75) Inventor: Toshitaka Miwa, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 49 days.

(21) Appl. No.: 10/675,079

(22) Filed: Sep. 30, 2003

(65) Prior Publication Data
US 2004/0070963 A1 Apr. 15, 2004

(30) Foreign Application Priority Data
Oct. 10, 2002 (JP) ........................................ 2002-297585

(51) Int. Cl.[7] .............................................. G01D 11/28
(52) U.S. Cl. .............................. 362/26; 362/23; 362/29; 362/30; 362/253; 362/555
(58) Field of Search ................ 362/26, 23, 29, 362/30, 100, 253, 277, 394, 555; 200/315, 316, 313

(56) References Cited

U.S. PATENT DOCUMENTS

| 5,901,836 A | * | 5/1999 | Taniuchi | 200/316 |
| 5,952,628 A | * | 9/1999 | Sato et al. | 200/4 |

\* cited by examiner

Primary Examiner—John Anthony Ward
Assistant Examiner—Mark Tsidulko
(74) Attorney, Agent, or Firm—Brinks Hofer Gilson & Lione (57) ABSTRACT

An illuminated electric part includes a manipulating shaft which is rotatable and is stable at least at two points. The manipulating shaft is light-transmissive and includes a pictograph portion which is illuminated at a top portion thereof. The illuminated electric part includes a light emitting element which is arranged at a side of the manipulating shaft. The manipulating shaft includes side faces which constitute light incident faces in directions orthogonal to an optical path from the light emitting element at respective stable points and, at the same time, includes a conical light reflecting face having a downwardly extending top at a side opposite to the incident faces.

4 Claims, 7 Drawing Sheets

ILLUMINATED ELECTRIC PART CAPABLE OF EFFICIENTLY RECEIVING INCIDENT LIGHT FROM LIGHT SOURCE IN LIGHT-TRANSMISSIVE MANIPULATING SHAFT

BACKGROUND OF THE INVENTION

1. Field of the Invention

The present invention relates to an illuminated electric part which is served for a vehicle-mounted power mirror device or the like and is provided with a manipulating shaft which has an illuminated display on a top portion thereof.

2. Description of the Related Art

As this type of illuminated electric part, there has been known a switch having an illuminated knob which is described in Patent Reference 1.

Figure 7:
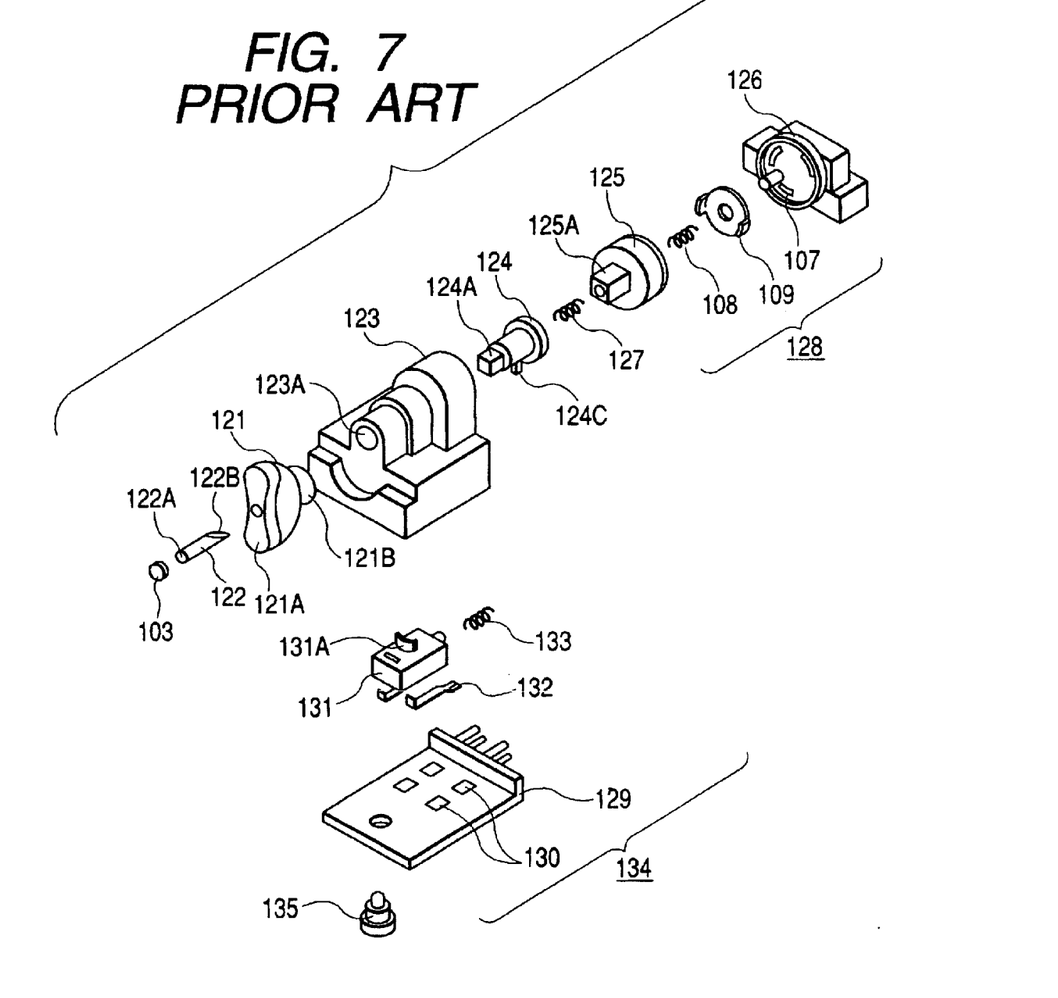
FIG. 7 is an exploded perspective view showing a conventional switch having an illuminated knob.

FIG. 7 is an exploded perspective view of this conventional switch having an illuminated knob. In the drawing, numeral 121 indicates a resin-made manipulating knob provided with a manipulating portion 121A and a fitting portion 121B, numeral 122 indicates a transparent circular-columnar or elliptical-columnar columnar first light guide body which is fitted in a center of the manipulating knob 121, and numeral 103 indicates a plate which is mounted on an illuminated face 122A formed on a front end of the first light guide body 122 and depicts characters of switching modes. To a rear end of the first light guide body 122, a light receiving portion 122B is provided, wherein the light receiving portion 122B is inclined by approximately 45° to guide light from below to the illuminated face 122A by reflecting the light in the axial direction and, at the same time, the light receiving portion 122B is curved upwardly to guide the light to the illuminated face 122A by reflecting light from below substantially perpendicularly in response to a rotating angle in a given range. In the manipulating knob 121, at a position below the light receiving portion 122B, an opening which is configured to open only within a rotary range of the manipulating knob 121 is formed.

Further, numeral 123 indicates a casing which has openings at a rear face and a lower face and has an open hole 123A at a front face, and numeral 124 indicates a movable shaft which is inserted into the open hole 123A of the casing 123 rotatably and in a state that the movable shaft 124 can be pushed. Here, a projection 124A of the movable shaft 124 projects from the open hole 123A of the casing 123 and is coupled to the fitting portion 121B of the manipulating knob 121.

Then, a rotary switch unit 128 is constituted as follows. Numeral 125 indicates a rotor which is rotatably housed in the casing 123, numeral 126 indicates a first terminal plate which is arranged behind the casing 123 and mounts a plurality of fixed contacts 107 in an erected manner. A rotary shaft 125A of the rotor 125 is inserted into a fitting hole 124B formed in a rear face of the movable shaft 124 and, at the same time, a restoring spring 127 is housed in a slightly deflected state between the rear face of the projection 124A and the rotary shaft 125A of the rotor 125. First contact pieces 109 which are mounted on a rear face of the rotor 125 are brought into resilient contact with the fixed contacts 107 by being biased by a pressure contact spring 108.

Further, a push switch unit 134 is constituted as follows. Numeral 129 indicate a second terminal plate which is arranged below the casing 123 and mounts a plurality of fixed contacts 130 on an upper face thereof, numeral 131 indicates a slider which is slidably housed in the casing 123, and numeral 132 indicates second contact pieces which are mounted on a lower face of the slider 131 and have distal ends thereof brought into resilient contact with fixed contacts 130. A pressing portion 124C which is mounted on a lower face of the movable shaft 124 is brought into contact with a projection 131A formed on an upper face of the slider 131, and a restoring spring 133 is disposed between a rear face of the slider 131 and the casing 123 in a slightly deflected state.

Further, numeral 135 indicates a first light emitting element such as a small bulb or a light emitting diode and is mounted on the second terminal plate 129 arranged below the light receiving portion 122B of the first light guide body 122.

In the above-mentioned constitution, when the manipulating portion 121A of the manipulating knob 121 is rotatably manipulated, the rotor 125 is moved by way of the movable shaft 124 so that the first contact pieces 109 which are mounted on a rear face of the rotor 125 are biased by pressure contact spring 108 and are resiliently rotated on the fixed contacts 107 whereby electric connection and separation of the electric connection are performed among a plurality of fixed contacts 107.

Further, when the manipulating portion 121A of the manipulating knob 121 is manipulated by pushing, the movable shaft 124 slides in the casing 123 while deflecting the restoring spring 127 and, at the same time, the pushing portion 124C formed on the lower face of the movable shaft 124 pushes the projection 131A of the slider 131. Accordingly, the slider 131 slides in the casing 123 while deflecting the restoring spring 133 so that distal ends of the second contact pieces 132 which are mounted on the lower face of the slider 131 resiliently slide on the fixed contacts 130 whereby electric connection and separation of the electric connection are performed among a plurality of fixed contacts 130. On the other hand, when the pushing force is released, the movable shaft 124 returns to the non-manipulated state due to the resilient restoring force of the restoring spring 127, while the slider 131 returns to the non-manipulated state due to the resilient restoring force of the restoring spring 133.

Figure 8A:
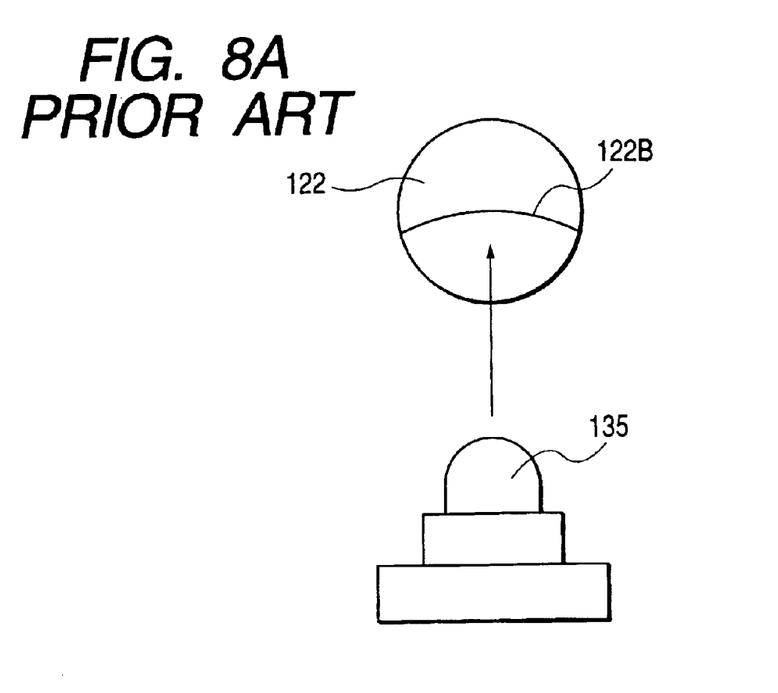
FIGS. 8A and 8B are front views of an essential part of the switch.

Further, when the first light emitting element 135 mounted on the second terminal plate 129 is turned on or lit, the light passes through the opening 121C of the manipulating knob 121 and is incident on the light receiving portion 122B of the first light guide body 122 above the first light emitting element 135. Here, the light receiving portion 122B is inclined by approximately 45° and has a face thereof curved upwardly to reflect the light incident from below in the axial direction and to guide the light to an illumination face 122A. Accordingly, the light is reflected on the light receiving portion 122B at an approximately right angle and advances upwardly in the inside of the first light guide body 122, and the light which passes through the illumination face 122A illuminate the characters of the switch modes on the plate 103.

Figure 8B:
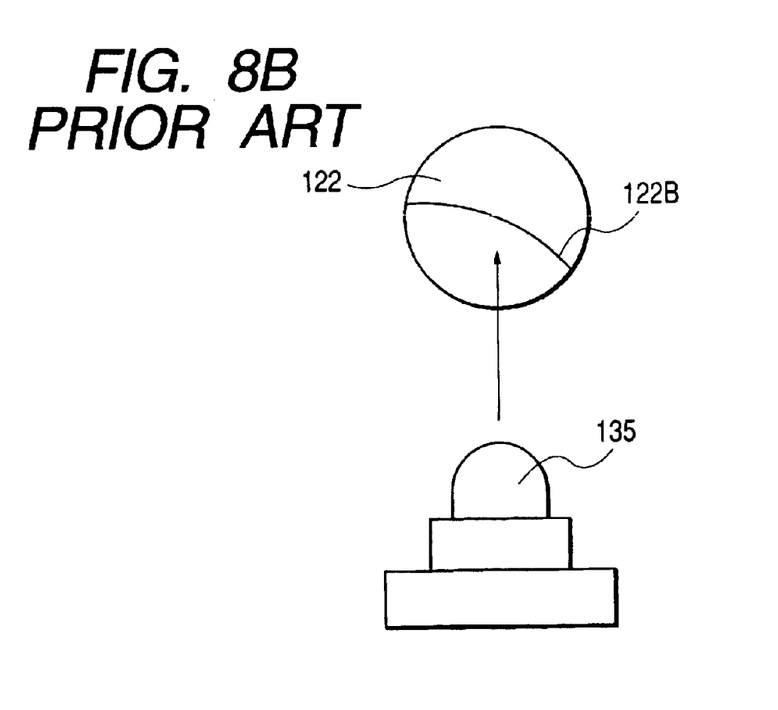

Further, as shown in FIG. 8B, even when the first light emitting element 135 is turned on in a state that the light receiving portion 122B is inclined due to the rotation of the manipulating knob 121, since the inclined face of the light receiving portion 122B of the first light guide body 122 on which the light of the first light emitting element 135 is incident assumes a surface which is curved upwardly so as to reflect the light from below in the axial direction in response to a rotational angle within a given range and to guide the light to the illumination face 122A, the light is incident on the inclined face of the light receiving portion 122B at an angle close to approximately 45° which is substantially equal to an angle in the state that the manipulating knob 121 is not rotated. Accordingly, the light is reflected on the light receiving portion 122B at a substantially right angle and advances in the inside of the first light guide body 122 and illuminates the illumination face 122A.

[Patent Reference 1]

Japanese Unexamined Patent Publication Hei 10-283867, pages 3 to 4 and FIG. 1, FIG. 2 and FIG. 4 (U.S. Pat. No. 5,901,836 is corresponding to the publication).

Here, in the conventional technique, the light emitted from the light emitting element 135 is incident from a peripheral side face of the circular-columnar first light guide body 122 which is exposed to the opening 121C of the manipulating knob 121 and is reflected on the inclined face of the light receiving portion 122B and is guided to the illuminating face 122A. Accordingly, the light from the light emitting element 135 is reflected on the peripheral side face of the first light guide body 122 and hence, a quantity of light which enters the first light guide body 122 is decreased whereby a sufficient intensity of illumination cannot be obtained. Accordingly, there arises a drawback that when a light emitting quantity is increased to ensure the sufficient intensity of illumination, a power consumption quantity is increased.

SUMMARY OF THE INVENTION

The present invention has been made to overcome the drawbacks of the prior art and it is an object of the present invention to provide an illuminated electric part which can efficiently make light from a light source incident on the inside of a light-transmissive manipulating shaft.

To solve the above-mentioned drawback, according to a first aspect of the present invention, an illuminated electric part includes a manipulating shaft which is rotatable and is stable at least at two points, the manipulating shaft being light-transmissive and having a display to be illuminated on a top portion thereof. The illuminated electric part also includes a light source arranged at a side of the manipulating shaft. The manipulating shaft has light incident faces in directions orthogonal to an optical path from a light source at respective stable points, and a coned light reflecting face having a top thereof which extends downwardly at a side thereof opposite to the incident faces.

Due to such a constitution, even when the manipulating shaft is rotatably manipulated, it is possible to make the light from the light source efficiently incident on the light-transmissive manipulating shaft.

According to a second aspect of the present invention, in the constitution of the first aspect of the present invention, the light reflecting face has a conical shape.

According to this constitution, since the light reflecting face has the conical shape, it is possible to reflect light in all directions.

According to a third aspect of the present invention, in the constitution of the first aspect of the present invention, the manipulating shaft is tiltably supported.

Due to such a constitution, even when the manipulating shaft is rotatably and tiltably manipulated, it is possible to make the light from the light source efficiently incident inside the light-transmissive manipulating shaft.

DESCRIPTION OF THE PREFERRED EMBODIMENT

One embodiment of an illuminated electric part according to the present invention is explained in conjunction with FIG. 1 to FIG. 6.

The illuminated electric part according to this embodiment is explained in conjunction with an illuminated electric part which is applied to power mirror devices which electrically perform the adjustment of viewing angles of side mirrors which are provided at left and right sides of a car body of an automobile. The power mirror device is explained in conjunction with a type of device which manipulates a mirror selection switch for selecting either one of left and right side mirrors and a viewing angle adjusting switch for adjusting the viewing angle of the selected side mirror by the switch using a single manipulating shaft.

Figure 1:
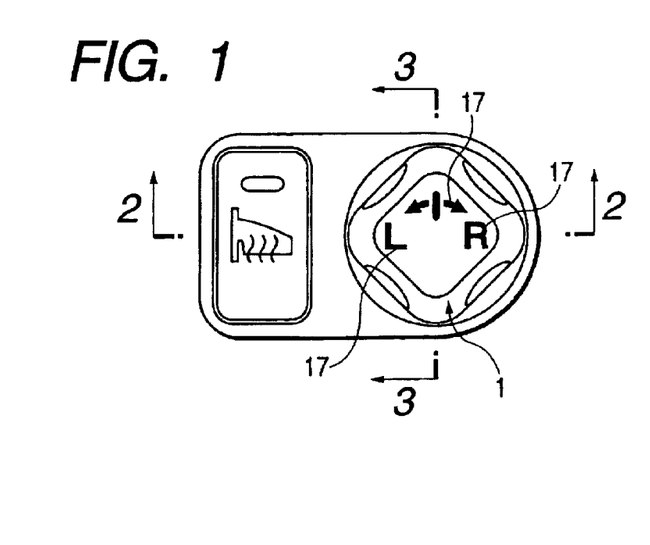
FIG. 1 a plan view of an illuminated electric part according to an embodiment of the present invention.
Figure 2:
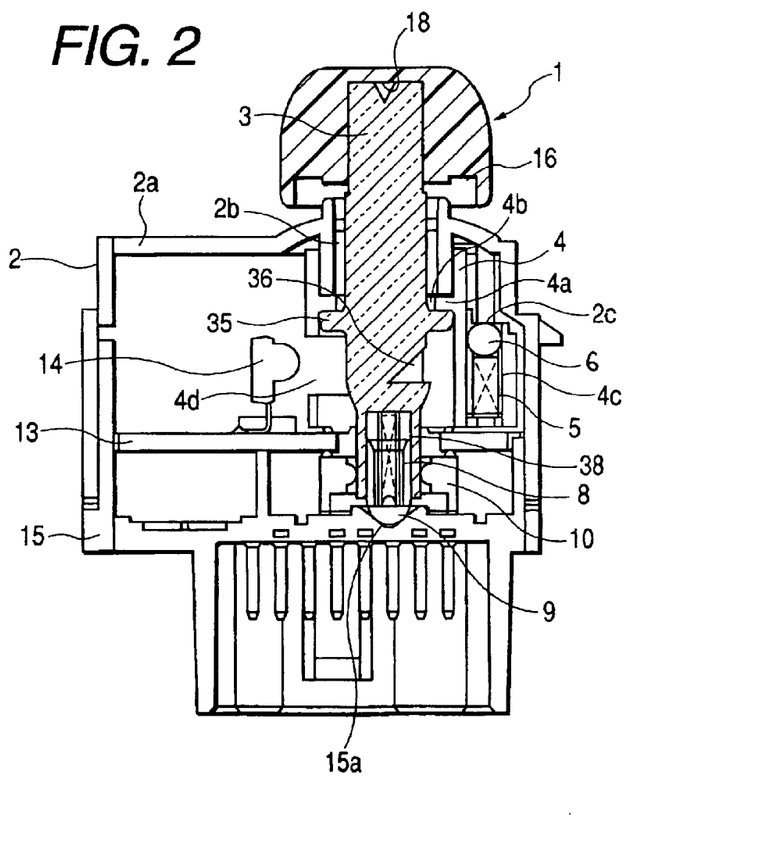
FIG. 2 is a cross-sectional view taken along a line 2—2 in FIG. 1.

As can be clearly understood from FIG. 1 and FIG. 2, the illuminated electric part according to this embodiment is substantially constituted of a knob 1, a casing 2, a manipulating shaft 3, a movable bearing 4 which tiltably and rotatably supports the manipulating shaft 3, a coil spring 5 which has an end thereof held by the movable bearing 4, a ball 6 which is pushed to a contact 2c of an inner face of a ceiling of the casing 2 by the coil spring 5, a coil spring 8 and an actuator 9 which are mounted on a lower end of the manipulating shaft 3, a slider 10 which is driven by the rotational manipulation or the tilting manipulation of the manipulating shaft 3, two movable contacts 11 and coil springs 12 which are mounted on the slider 10, a printed wiring board 13 on which given electric circuits including fixed contacts for changing over left and right mirrors and fixed contacts for adjusting a viewing angle are formed, a light emitting element 14 which is connected to the printed wiring board 13, and a wafer 15 to which a plurality of leads which are electrically connected to the printed wiring board 13 and a holding portion for holding the slider 10 are provided.

The knob 1, as shown in FIG. 1 to FIG. 4, includes a grip portion 4 having a quadrangular cylindrical shape and light-transmissive pictographs 17 which are formed on an upper face of the gripping portion 16 for displaying functions of the illuminated electric part. Both of these portions are formed of an insulating resin material. Inside the gripping portion 16, a fitting hole 18 which allows fitting of the manipulating shaft 3 therein is formed, while in an inner periphery of the fitting hole 18, stopper pawls 19 which engage with the manipulating shaft 3 are formed downwardly.

The casing 2 which houses respective members explained hereinafter, is made of an insulating resin material, and is formed in a box shape having a lower face thereof opened. In an upper face 2a of the casing 2, a through hole 2b which allows the manipulating shaft 3 to penetrate therethrough in a tiltable manner is formed. A plurality of ball receiving portions (contacts) 2c (three positions made up of a neutral position, right and left positions which are rotated to the left and right from the neutral position by 45 degrees in this embodiment) which engage with the ball 6 which is provided to the movable bearing 4 and give a click feeling during the rotational manipulation of the knob 1 are formed on an inner face of the upper face 2a. Further, a plurality of engaging holes 2d which integrally engage the wafer 15 with the casing 2 are formed in a lower end of the casing 2.

The manipulating shaft 3 is provided for performing given switching manipulation through the selective changeover manipulation by transmitting a force applied to the knob 1 to respective members housed in the casing 2 and is constituted of a circular column 31 and a prism-like column 32. Further, the whole manipulating shaft 3 is formed of a light-transmissive material and hence, the manipulating shaft 3 constitutes a light guide path therein. Further, in the vicinity of an upper end of the circular column 31, engaging steps 33 for allowing the engagement of stopper pawls 19 formed in the knob 1 are formed. Further, in the upper end of the manipulating shaft 3, grooves 34, 34 which function as stoppers for rotation when the manipulating shaft 3 is fitted into the fitting hole 18 of the knob 1 are formed. Projections (omitted from the drawing) of the fitting hole 18 are fitted into the grooves 34, while distal ends of the stopper pawls 19 engage with the engaging steps 33 so as to integrally connect the knob 1 and the manipulating shaft 3. Further, between the circular column 31 and the prism-like column 32, a flange member 35 having a polygonal shape (octagonal shape in this embodiment) in a planar shape is integrally formed.

On the other hand, as shown in FIGS. 5, the prism-like column 32 is formed in an octagonal columnar shape as a whole, wherein a small-diameter prism-like column 32a is formed at a position close to a lower end thereof, a large-diameter prism-like column 32b is formed at an upper portion thereof, and a quadrangular pyramid 32c is formed between the small-diameter prism-like column 32a and the large-diameter prism-like column 32b. A conical reflecting face 36 is formed on the large-diameter pyramid-like column 32b by notching. An axis of the reflecting face 36 is coaxial with an axis of the large-diameter prism-like column 32b and a top of a conical shape of the reflecting surface 36 is positioned at a lower end of the large-diameter prism-like column 32b. Respective side faces 32b1 of the large-diameter prism-like portion 32a which face the reflecting face 36 in an opposed manner constitute incident faces for light emitted from the light emitting element 14, wherein the light is reflected upwardly on the reflecting face 36 and illuminates the pictograph portion 17 of the knob 1. Numeral 37 indicates a projection which is formed on the small-diameter prism-like column 32a. When the small-diameter prism-like column 32a is inserted into the slider 10 and the slider 10 is subjected to the sliding operation and the rotational operation, the slider 10 is subjected to the rotational operation together with the rotation of the manipulating shaft 3 due to the projection 37. Further, a housing hole 38 is formed in a lower end face of the small-diameter prism-like column 32a and the coil spring 8 and the actuator 9 are housed in this housing hole 38. Further, by pushing the actuator 9 to a bottom face of the wafer 15 by means of a spring force of the coil spring 8, an upward force acts on the manipulating shaft 3 so that the flange member 35 is received by a receiving portion 4a of the movable bearing 4.

The movable bearing 4 tiltably holds the flange member 35 of the manipulating shaft 3 by receiving such the flange member 35 and, at the same time, rotatably drives the slider 10 which will be explained hereinafter by being integrally rotated with the manipulating shaft 3. The movable bearing 4 is formed in a circular cylindrical shape having a receiving portion 4a using an insulating resin material. A through hole 4b which allows the manipulating shaft 3 to penetrate therethrough tiltably is formed in the receiving portion 4a. Further, an inner surface of the movable bearing 4 has a planar shape thereof formed in a polygonal shape (octagonal shape in this embodiment) which allows the insertion of the above-mentioned flange member 35. Accordingly, the above-mentioned manipulating shaft 3 is tiltable independently from the movable bearing 4, while when the manipulating shaft 3 is rotated about an axis thereof, the movable bearing 4 is also integrally rotated together with the flange member 35. Further, in an outer face of the movable bearing 4, a housing hole 4c which houses the coil spring 5 and the ball 7 for clicking is formed. Further, in the outside face of the movable bearing 4 which faces the light emitting element 14 described later, a through hole 4d is formed.

The slider 10 performs the slide operation in the tilting direction of the manipulating shaft 3 or the rotational reciprocal movement about the axis of the manipulating shaft 3 in an interlocking manner with the tilting manipulation or the rotating manipulation of the manipulating shaft 3. The slider 10 is formed of a rectangular plate having a rectangular planar shape using an insulating resin material. As shown in FIG. 1 to FIG. 4, at a center of a substrate 10a of the slider 10, a through hole 10b which penetrates the prism-like column 32 of the manipulating shaft 3 is formed. Further, in surfaces of both longitudinal ends of the slider 10, two movable contact mounting holes 10c for mounting the movable contacts 11 and two spring mounting holes 10d for mounting the coil springs 12 are formed. The spring mounting holes 10d are formed at a center between a pair of movable contact mounting holes 10c. Further, in an inner face of the through hole 10b, a recessed groove 10e which engages with the projection 37 of the manipulating shaft 3 is formed.

The movable contact 11 is made of an electrically conductive material such as phosphor bronze which exhibits excellent resiliency and the excellent conductivity and is formed in a V shape.

The coil spring 12 always pushes the movable contact 11 to the back face of the printed wiring circuit board 13.

On a front face side of the printed wiring circuit board 13, fixed contacts for changing over left and right mirrors which are changed over by the movable contacts 11 (omitted from the drawing) and fixed contacts for adjusting inclination (omitted from the drawing) are formed. Further, on one side portion of the printed wiring circuit board 13, a plurality of through holes 13a are formed, wherein leads which are provided to the wafer 15 are inserted into these through holes 13a and are electrically connected with a conductive pattern formed on the printed wiring circuit board 13. Further, in the printed wiring circuit board 13, through holes 13b which are served for electrically connecting the light emitting element 14 described hereinafter are formed.

Figure 6A:
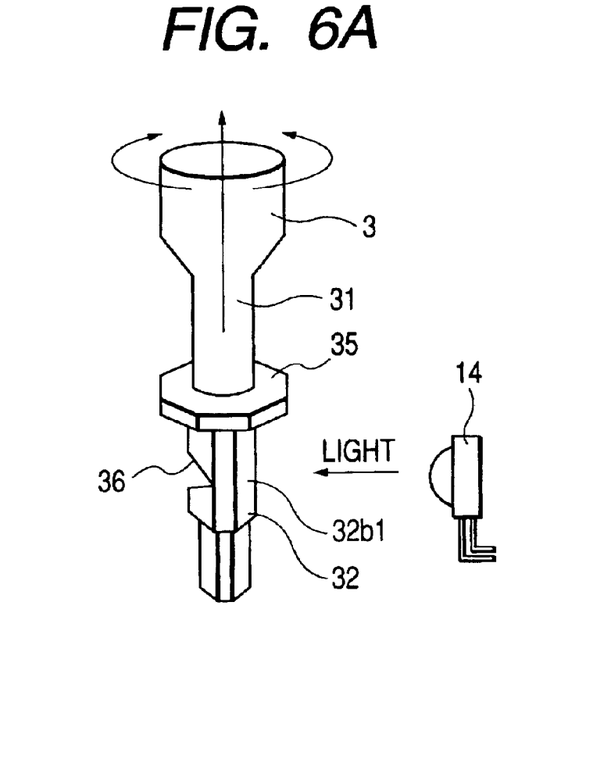
FIG. 6A is a view for explaining an essential part of an illuminated electric part according to the embodiment of the present invention.
Figure 6B:
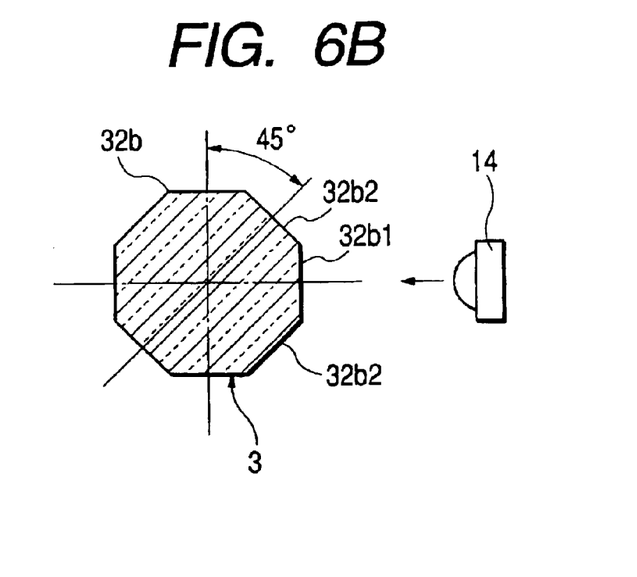
FIG. 6B is a view for explaining an essential part of an illuminated electric part according to the embodiment of the present invention.

As the light emitting element 14, a light emitting diode is preferable in view of the fact that the light emitting diode is small-sized and exhibits a long lifetime. The light emitting element 14 is, as shown in FIG. 2 and FIG. 6, arranged to face a side face (incident face) 32b1 opposite to a reflecting face 36 formed on the large-diameter prism-like column 32b of the manipulating shaft 3.

Figure 3:
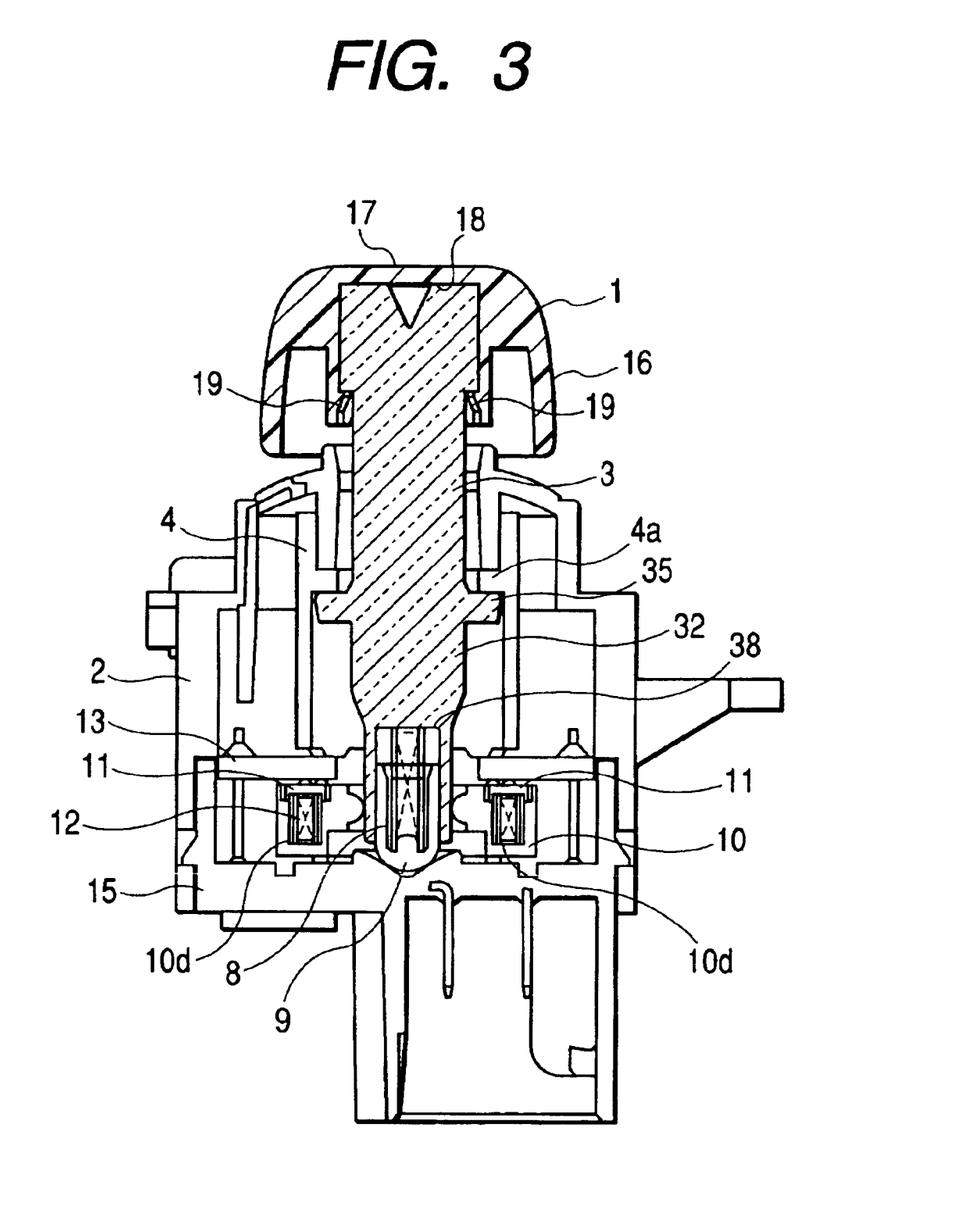
FIG. 3 is a cross-sectional view taken along a line 3—3 in FIG. 1.
Figure 4:
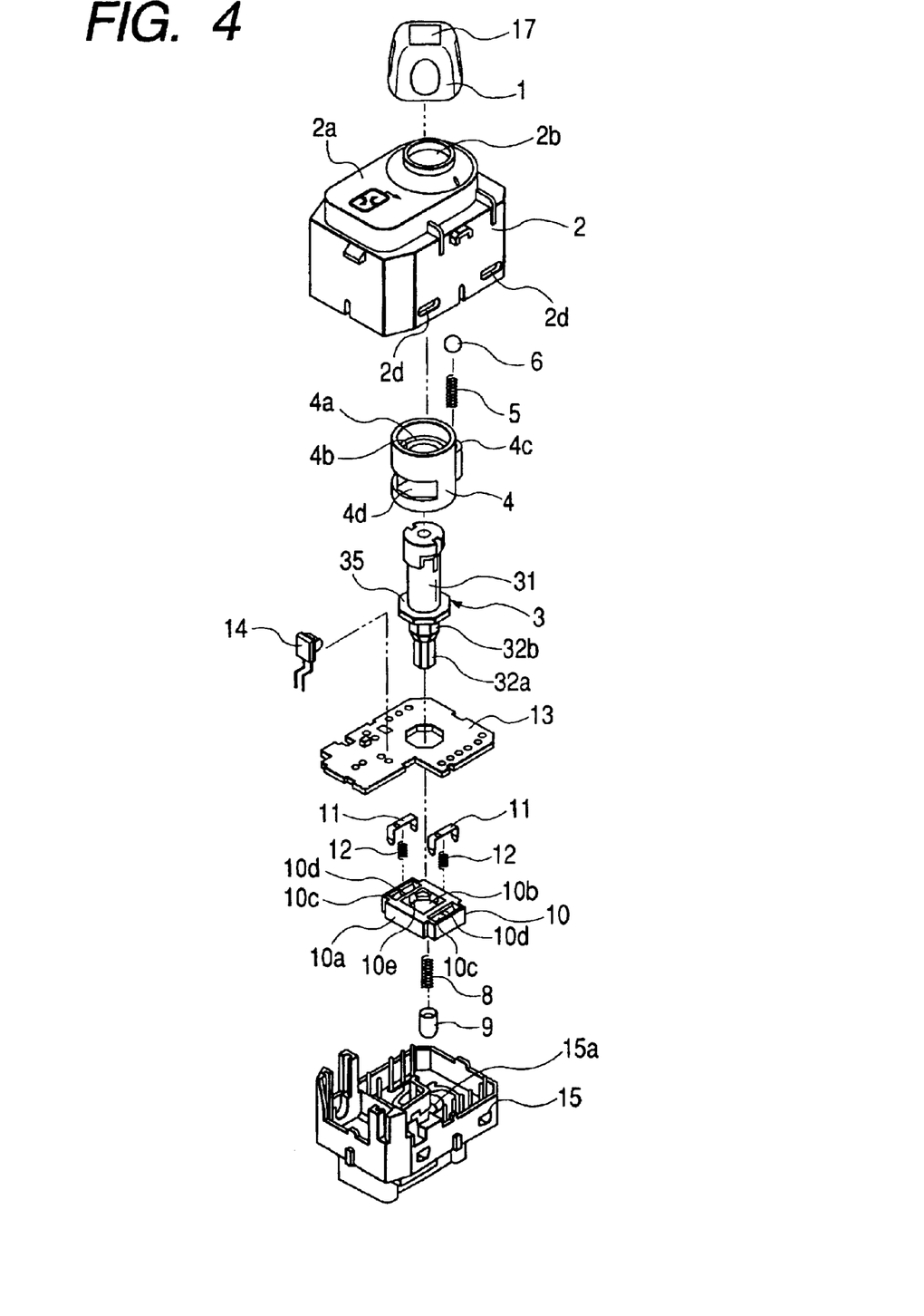
FIG. 4 is an exploded perspective view of an illuminated electric part according to the embodiment of the present invention.
Figure 5A:
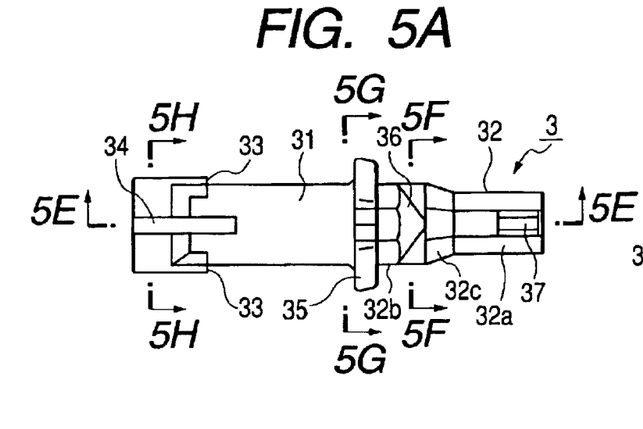
FIG. 5A is a front view of a manipulating shaft.
Figure 5B:
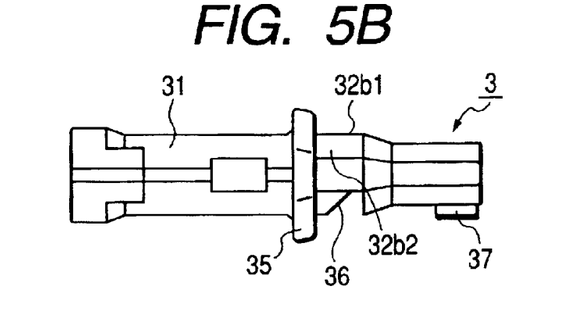
FIG. 5B is a front view of a manipulating shaft.
Figure 5C:
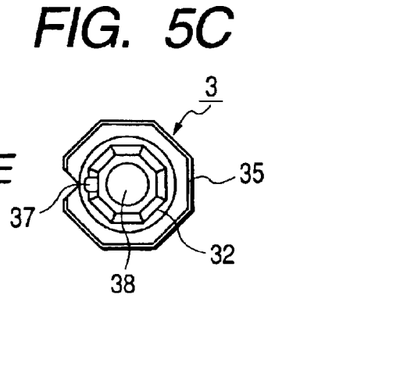
FIG. 5C is a right side view of a manipulating shaft.
Figure 5D:
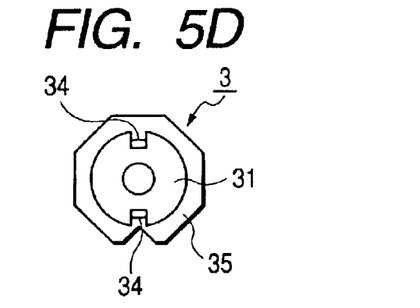
FIG. 5D is a left side view of a manipulating shaft.
Figure 5E:
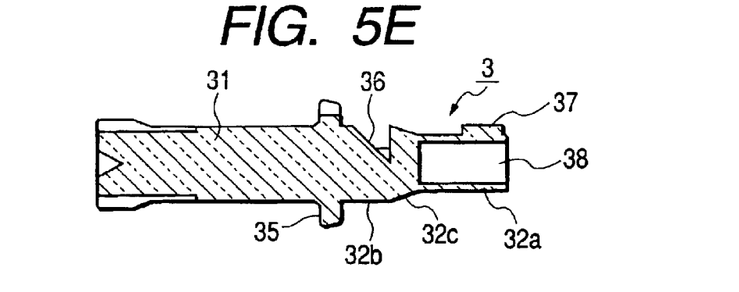
FIG. 5E is a cross-sectional view taken along a line 5E—5E in FIG. 5A.
Figure 5F:
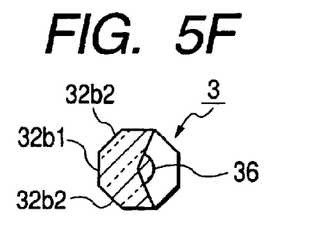
FIG. 5F is a cross-sectional view taken along a line 5F—5F in FIG. 5A.
Figure 5G:
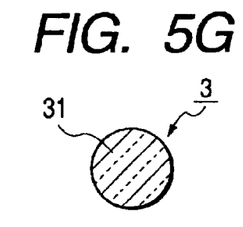
FIG. 5G is a cross-sectional view taken along a line 5G—5G in FIG. 5A.
Figure 5H:
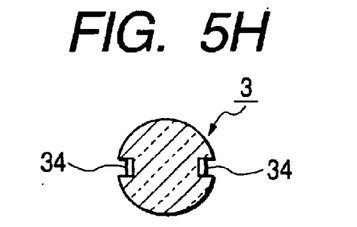
FIG. 5H is a cross-sectional view taken along a line 5H—5H in FIG. 5A.

The wafer 15 which is electrically connected with the printed wiring circuit board 13 holds the above-mentioned various built-in parts and is provided with a connector function for taking out switch signals obtained by the manipulation of the knob 1 to the outside and is formed of an insulating resin material. As shown in FIG. 2 to FIG. 4, the actuator 9 of the manipulating shaft 3 is brought into pressure contact with the wafer 15 and a recess 15a for returning the manipulating shaft 3 to a neutral position (non-manipulating position in FIG. 2) is formed in the wafer 15.

The manner of operation of the illuminated electric part according to this embodiment having the above-mentioned constitution is explained hereinafter.

When the knob 1 assumes a first position (position shown in FIG. 1) which is a non-manipulating state, both of the left-and-right mirror changeover switch and the viewing angle adjusting switch are changed over to the neutral position and the manipulating shaft 3 is held at the neutral position due to a resilient force of the coil spring 8.

When the knob 1 resting at the first position is rotatably manipulated in the "L" direction or the "R" direction shown in FIG. 1, a rotational force is transmitted to the slider 10 by way of the manipulating shaft 3 and hence, the slider 10 is rotated and positioned at either the fixed point of the viewing adjusting switch for left mirror or the fixed contact of the viewing angle adjusting switch for right mirror whereby the switch is for left and right mirrors can be changed over. Here, the movable bearing 4 is rotated together with the rotation of the manipulating shaft 3 and the ball 6 which is biased by the coil spring 5 is moved between respective ball receiving portions 2c formed in the casing 2 and hence, a user can perceive a click feeling each time the ball 6 moves between respective ball receiving portions 2c whereby the left-and-right mirror changeover manipulation can be surely performed with the favorable use feeling. Further, when a hand is removed from the knob 1, the knob is held at the position.

Further, when the knob 1 (manipulating shaft 3) is rotated by 45 degrees in the right direction (or in the left direction) from the first position in the above-mentioned manner, the illuminated electric part assumes a state which enables the viewing angle adjustment of the right mirror. When the knob 1 is tilted either in the vertical direction (up-and-down direction) or the lateral direction (left-and-right direction) in such a state, the tilting force is transmitted to the slider 10 by way of the manipulating shaft 3 so that the slider 10 is moved in a sliding manner whereby the viewing angle adjustment switch is changed over to an ON state. In this case, when the hand is removed from the knob 1, due to the resilient force of the coil spring 8, the knob 1 automatically returns to the neutral position (non-inclined state of the manipulating shaft 3).

Here, the light emitting element 14 can be turned on regardless of the changeover manipulation of the switch and can be particularly selectively turned on when a specific switch is turned on. Light which is irradiated from the light emitting element 14 is incident from the incident face formed on the manipulating shaft 3, is illuminated to the knob 1 after being reflected on the reflecting face 36, and illuminates the pictographs 17 which are displayed on the knob 1.

The light radiated from the light emitting element 14 is, as shown in FIG. 6, incident on the side face 32b1 of the large-diameter prism-like column 32b having an octagonal prism-like shape of the manipulating shaft 3. The side face 32b1 is arranged to be orthogonal to the optical path and enables the efficient incidence of the light from the light emitting element 14. The incident light is reflected upwardly on the reflecting face 36 having a conical shape which has a downwardly extending top and hence, the pictographs 17 on the knob 1 are equally illuminated with a sufficient intensity of illumination. Further, when the knob 1 is rotated by 45 degrees in the right direction in the above-mentioned manner, for example, the manipulating shaft 3 is rotated by 45 degrees so that the next side face 32b2 of the large-diameter prism-like column 32b having an octagonal prism shape of the manipulating shaft 3 is again arranged to be orthogonal to the optical path. Accordingly, even when the manipulating shaft 3 is rotated, the efficient incidence of light from the light emitting element 14 is ensured and hence, the pictographs 17 on the knob 1 can be illuminated with a sufficient intensity of illumination.

Further, even when the manipulating shaft 3 is tilted, the light incident into the manipulating shaft 3 is reflected on the outer peripheral face of the circular column 31 of the manipulating shaft 3 and hence, the pictographs 17 on the knob 1 can be illuminated with a sufficient intensity of illumination.

According to the vehicle-mounted power mirror device in this embodiment, the selection of one of left and right side mirrors and the viewing angle adjustment of the selected side mirror can be performed by manipulating one manipulating shaft and hence, the manipulation of the vehicle-mounted power mirror device can be extremely simplified.

As has been described heretofore, according to the present invention, even when the manipulating shaft is rotatably manipulated, it is possible to make the light from the light source efficiently incident inside the light-transmissive manipulating shaft.

Further, according to the present invention, since the light reflecting face has a conical shape, the light can be reflected in all directions.

Still further, according to the present invention, even when the manipulating shaft is rotatably and tiltably manipulated, it is possible to make the light from the light source efficiently incident inside the light-transmissive manipulating shaft.

What is claimed is:

1. An illuminated electric part comprising:
a manipulating shaft which is rotatable and is stable at least at two points, the manipulating shaft being light-transmissive and having a display to be illuminated at a top portion thereof; and
a light source arranged at a side of the manipulating shaft, wherein
the manipulating shaft has light incident faces comprising planes extending in directions orthogonal to an optical path from the light source at the respective stable points, and wherein a coned light reflecting face having a top thereof which extends downwardly at a side thereof opposite to the incident faces.

2. The illuminated electric part according to claim 1, wherein the light reflecting face has a conical shape.

3. The illuminated electric part according to claim 1, wherein the manipulating shaft is tiltably supported.

4. The illuminated electric part according to claim 2, wherein an axis of the light reflecting face is positioned on the center of rotation of the manipulating shaft.

* * * * *